(12) United States Patent
Masuda et al.

(10) Patent No.: US 12,341,220 B2
(45) Date of Patent: Jun. 24, 2025

(54) ENERGY STORAGE APPARATUS

(71) Applicant: GS Yuasa International Ltd., Kyoto (JP)

(72) Inventors: Yoshihiro Masuda, Shiga (JP); Tsuyoshi Hidaka, Shiga (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 802 days.

(21) Appl. No.: 17/635,517

(22) PCT Filed: Aug. 18, 2020

(86) PCT No.: PCT/JP2020/031184
§ 371 (c)(1),
(2) Date: Feb. 15, 2022

(87) PCT Pub. No.: WO2021/039511
PCT Pub. Date: Mar. 4, 2021

(65) Prior Publication Data
US 2022/0320687 A1    Oct. 6, 2022

(30) Foreign Application Priority Data

Aug. 23, 2019  (JP) .................................. 2019-152560

(51) Int. Cl.
*H01M 50/505*  (2021.01)
*H01M 50/209*  (2021.01)

(52) U.S. Cl.
CPC ....... *H01M 50/505* (2021.01); *H01M 50/209* (2021.01); *H01M 2220/20* (2013.01)

(58) Field of Classification Search
CPC .......................... H01M 50/505; H01M 50/209
See application file for complete search history.

(56) References Cited

U.S. PATENT DOCUMENTS

| 2014/0017546 A1 | 1/2014 | Yanagi |
| 2019/0181569 A1 | 6/2019 | Nakayama et al. |

FOREIGN PATENT DOCUMENTS

| JP | 2001-135288 A | 5/2001 |
| JP | 2014-022092 A | 2/2014 |
| JP | 2014-103120 A | 6/2014 |
| JP | 2014-203743 A | 10/2014 |
| JP | 2014-216195 A | 11/2014 |
| JP | 2016-038933 A | 3/2016 |

(Continued)

OTHER PUBLICATIONS

International Search Report (ISR) (PCT Form PCT/ISA/210), in PCT/JP2020/031184, dated Nov. 2, 2020.

*Primary Examiner* — Sarah A. Slifka
(74) *Attorney, Agent, or Firm* — MCGINN I.P. LAW GROUP, PLLC

(57) ABSTRACT

An energy storage apparatus (1) includes an energy storage device (20), a plate-shaped first member (harness plate (50)) arranged above the energy storage device (20), and a second member (bus bar frame (30)) arranged below the first member. A first one of the first member and the second member has a first convex part (first convex part (32)) projecting toward a second one, and the second one of the first member and the second member has a first concave part or a through hole (through hole (53)) into which the first convex part is inserted, and a second convex part (second convex part (51)) projecting along periphery of the first convex part so as to surround the periphery of the first convex part.

10 Claims, 8 Drawing Sheets

(56) References Cited

FOREIGN PATENT DOCUMENTS

| | | |
|---|---|---|
| JP | 2019-106247 A | 6/2019 |
| JP | 2019-197665 A | 11/2019 |
| JP | 2020-149906 A | 9/2020 |

ENERGY STORAGE APPARATUS

TECHNICAL FIELD

The present invention relates to an energy storage apparatus including an energy storage device and a member arranged above the energy storage device.

BACKGROUND ART

Conventionally, an energy storage apparatus including an energy storage device and a first member arranged above the energy storage device has been known. Patent Document 1 discloses a battery pack (energy storage apparatus) including a battery (energy storage device) and an air supply passage (first member) arranged above the battery, in which a power cable is arranged in the air supply passage.

PRIOR ART DOCUMENT

Patent Document

Patent Document 1: JP-A-2014-22092

SUMMARY OF THE INVENTION

Problems to be Solved by the Invention

In the energy storage apparatus, in the configuration in which the first member having a plate shape is arranged above the energy storage device, the position of the first member may be displaced.

An object of the present invention is to provide an energy storage apparatus which can suppress displacement of a position of a first member having a plate shape in a configuration in which the first member is arranged above an energy storage device.

Means for Solving the Problems

An energy storage apparatus according to an aspect of the present invention includes an energy storage device, a plate-shaped first member arranged above the energy storage device, and a second member arranged below the first member. A first one of the first member and the second member has a first convex part projecting toward a second one of the first member and the second member, and the second one includes a first concave part or a through hole into which the first convex part is inserted, and a second convex part projecting along periphery of the first convex part so as to surround the periphery of the first convex part.

The present invention can be realized not only as an energy storage apparatus but also as the first member and the second member.

Advantages of the Invention

According to an energy storage apparatus in the present invention, displacement of a position of a first member having a plate shape can be suppressed in a configuration in which the first member is arranged above an energy storage device.

MODE FOR CARRYING OUT THE INVENTION

Figure 1:
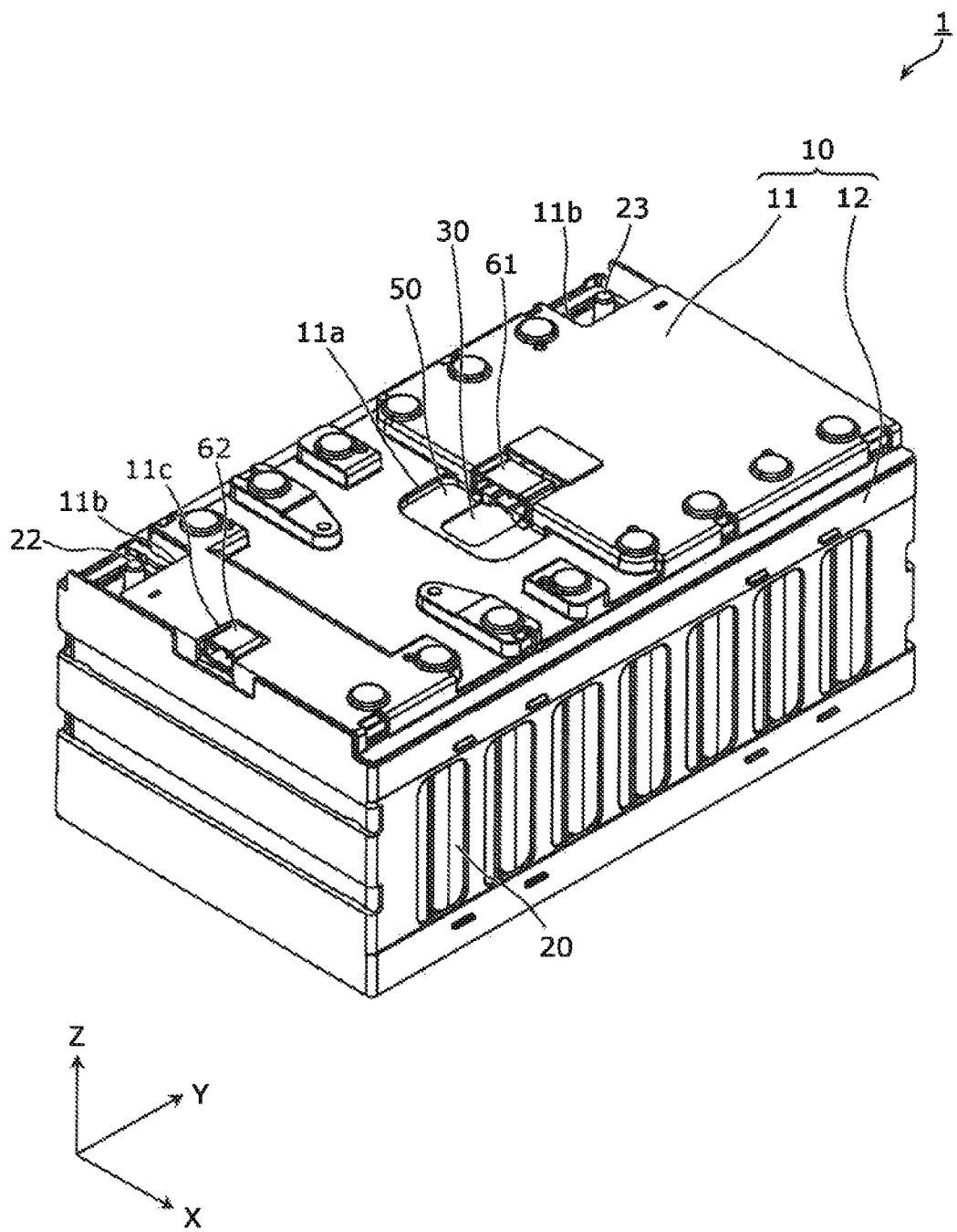
FIG. 1 is a perspective view illustrating an external appearance of an energy storage apparatus according to an embodiment.

In the configuration in which the first member is arranged above the energy storage device as in the conventional energy storage apparatus, the first member is desirably formed in a thin plate shape from the viewpoint of space saving. However, when the first member is formed in a plate shape, the first member may be warped and may be detached from another member that positions the first member, and the position of the first member may be displaced. Also in a case where vibration, impact, or the like is applied to the energy storage apparatus from the outside, the first member may be detached from another member and the position of the first member is displaced. As described above, the inventor of the present application has found that the position of the first member may be displaced in the configuration in which the first member having a plate shape is arranged above the energy storage device.

The present invention has been made in view of the above problems, and an object of the present invention is to provide an energy storage apparatus which can suppress displacement of a position of a first member having a plate shape in a configuration in which the first member is arranged above an energy storage device.

In order to achieve the above object, an energy storage apparatus according to an aspect of the present invention includes an energy storage device, a plate-shaped first member arranged above the energy storage device, and a second member arranged below the first member. A first one of the first member and the second member has a first convex part projecting toward a second one of the first member and the second member, and the second one includes a first concave part or a through hole into which the first convex part is inserted, and a second convex part projecting along periphery of the first convex part so as to surround the periphery of the first convex part.

According to this configuration, in the energy storage apparatus, the first one of the first member having a plate-like shape above the energy storage device and the second member below the first member has the first convex part, and the second one has the first concave part or the through hole into which the first convex part is inserted and the second convex part which projects so as to surround the periphery of the first convex part. As described above, the second convex part projecting so as to surround the periphery of the first convex part of the first one is formed on the second one, so that the first convex part is arranged along the second convex part. Accordingly, it is possible to prevent the first convex part from being detached from the first concave part or the through hole. In this manner, the first member can be prevented from being detached from the second member, so that displacement of the position of the first member can be suppressed.

The first one may include a second concave part into which the second convex part is inserted, the second concave part being arranged so as to surround the periphery of the first convex part.

According to this configuration, a first one of the first member and the second member has the second concave part into which the second convex part of the second one is inserted, the second concave part being arranged so as to surround the periphery of the first convex part. As described above, the second concave part into which the second convex part of the second one is inserted is formed around the first convex part of the first one, so that the first member and the second member can be arranged close to each other. In this manner, even if the second convex part is formed on the second one, it is possible to suppress generation of a wasteful space, so that space saving can be achieved.

The first convex part may be arranged so as to project further than a main surface of the second one.

According to this configuration, the first convex part of the first one of the first member and the second member is arranged so as to project further than a main surface of the second one. In this manner, as the first convex part of the first one is arranged so as to project further than the main surface of the second one, it is possible to suppress the first convex part from being detached from the second one. In this manner, the first member can be prevented from being detached from the second member, so that displacement of the position of the first member can be suppressed.

The first concave part or the through hole may have a long groove shape or a long hole shape in top view.

According to this configuration, the first concave part or the through hole is formed in a long groove shape or a long hole shape in top view and hence, when the first convex part is inserted into the first concave part or the through hole, a clearance which allows the first convex part to move in the first concave part or the through hole can be formed. This facilitates assembly work of the first member and the second member.

A plurality of the energy storage devices may be arranged in an arrangement direction, and a plurality of the first concave parts or the through holes may be arranged in a direction intersecting the arrangement direction, and at least one of a plurality of the first concave parts or the through holes may have a long groove shape or a long hole shape extending in the intersecting direction in top view.

According to this configuration, at least one of a plurality of the first concave parts or a plurality of the through holes which are arranged in a direction intersecting the arrangement direction of the energy storage devices is formed into a long groove shape or a long hole shape which extends in the intersecting direction in top view. In this manner, when a plurality of the first convex parts are inserted into a plurality of the concave parts or through holes, variations in positions and dimensions in the intersecting direction of a plurality of the concave parts or the through holes can be absorbed.

A plurality of the energy storage devices may be arranged in an arrangement direction, and the first concave part or the through hole may be arranged in a center portion of the second one in the arrangement direction.

According to this configuration, the first concave part or the through hole is arranged in the center portion of the second one of the first member and the second member, so that it is possible to suppress variations in dimensions between the first one and the second one of the first member and the second member.

A third member arranged above the first member may be included.

According to this configuration, since the third member is arranged above the first member, the third member can suppress warping of the first member or restrict upward movement of the first member. In this manner, the first member can be prevented from being detached from the second member, so that displacement of the position of the first member can be suppressed.

The first member may have a third convex part projecting toward the third member.

According to this configuration, the first member has the third convex part which projects toward the third member and hence, the movement of the first member toward the third member is restricted as the third convex part abuts on the third member. In this manner, the first member can be prevented from being detached from the second member, so that displacement of the position of the first member can be suppressed.

The second member may have the first convex part, and the first member may have the through hole.

According to this configuration, the second member has the first convex part, and the first member has the through hole. As described above, as the first convex part is formed on the lower second member and the through hole is formed on the upper first member, it is possible to confirm a state in which the first convex part of the second member is inserted into the through hole of the first member from above. In this manner, it is possible to reduce mistakes in inserting the first convex part into the through hole, and thus, it is possible to more reliably suppress displacement of the position of the first member.

The first member may be a harness plate that holds a wiring.

According to this configuration, since the first member is the harness plate that holds the wiring, it is possible to suppress displacement of the position of the harness plate. That is, there is a case where the harness plate is formed of a thin resin member that is easily warped. However, even in this case, the harness plate can be prevented from being warped and detached from the second member. In this manner, it is possible to suppress displacement of the position of the harness plate as the first member.

Hereinafter, the energy storage apparatus according to an embodiment (including a variation of the embodiment) of the present invention will be described with reference to the drawings. All the embodiments described below illustrate a comprehensive or specific example. Numerical values, shapes, materials, constituent elements, arrangement positions and connection modes of the constituent elements, and the like shown in the embodiments below are merely examples, and are not intended to limit the present invention. In each drawing, dimensions and the like are not strictly illustrated.

In description and drawings below, an arrangement direction of a pair of electrode terminals (on the positive electrode side and the negative electrode side) in one energy storage device, a facing direction of a short side surface of a case of the energy storage device, or a facing direction of a long side surface of an outer case of the energy storage apparatus is defined as an X-axis direction. An arrangement direction of a plurality of the energy storage devices, a facing direction of a long side surface of a case of the energy storage device, or a facing direction of a short side surface of the outer case of the energy storage apparatus is defined as a Y-axis direction. An arrangement direction of an outer case main body and a lid body of the energy storage apparatus, an arrangement direction of the energy storage device, the bus bar frame, the harness plate, and the lid body, an arrangement direction of a case main body and the lid portion of the energy storage device, or a vertical direction is defined as a Z-axis direction. The X-axis direction, the Y-axis direction, and the Z-axis direction are directions intersecting (orthogonal to in the present embodiment) each other. Although a case where the Z-axis direction is not the vertical direction can be considered depending on a usage mode, the Z-axis direction will be described below as the vertical direction for convenience of description.

In description below, the X-axis direction plus side indicates the arrow direction side of the X axis, and the X-axis minus side indicates the side opposite to the X-axis direction plus side. The same applies to the Y-axis direction and the Z-axis direction. Furthermore, expressions indicating a relative direction or postures, such as parallel and orthogonal, may be used, and the expression includes a case where the direction or posture is not strictly expressed. That two directions are orthogonal to each other not only means that the two directions are completely orthogonal to each other, but also means that the two directions are substantially orthogonal to each other, that is, a difference of about several percent is included.

Embodiment

[1 General Description of Energy Storage Apparatus 1]

Figure 2:
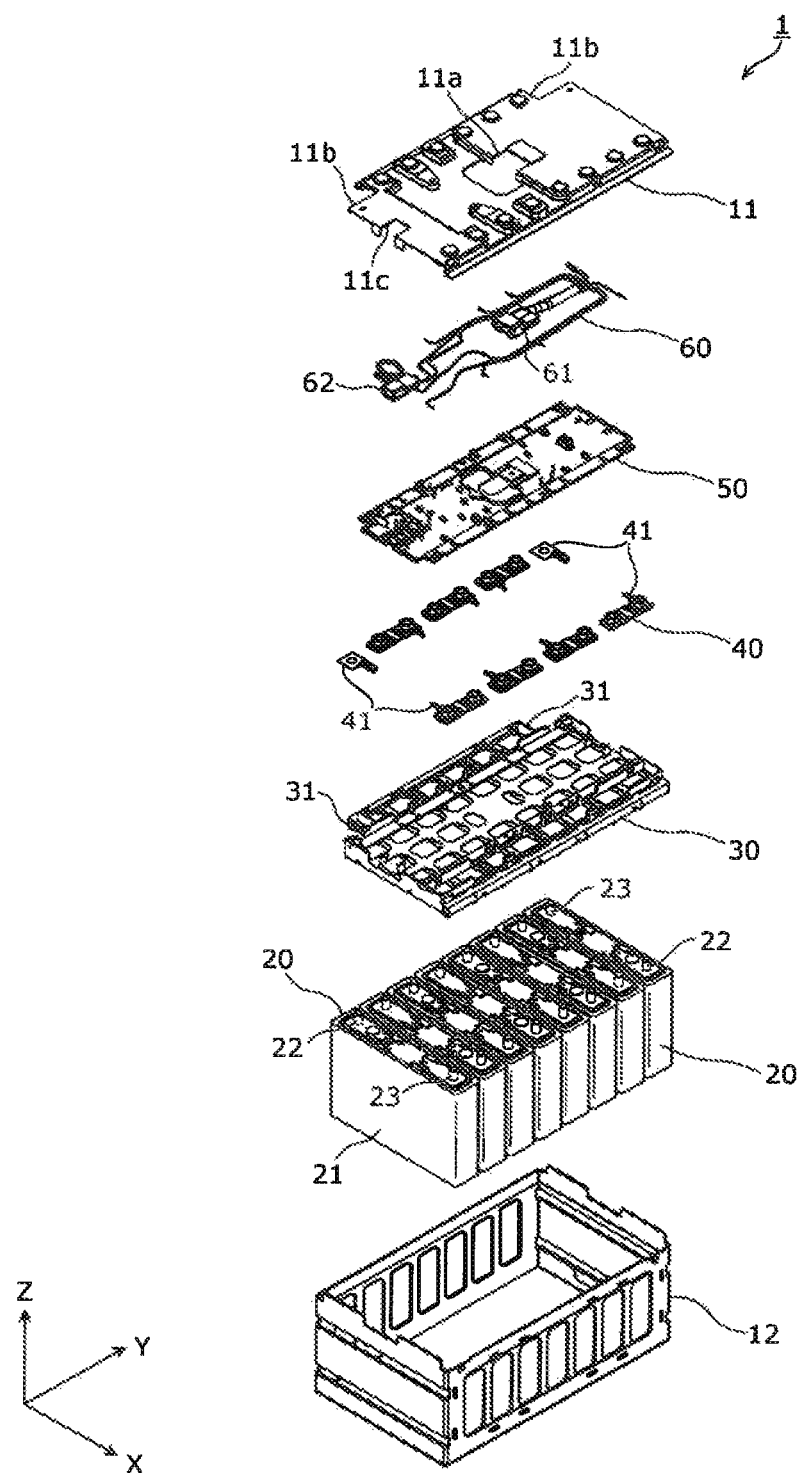
FIG. 2 is an exploded perspective view illustrating each constituent element in a case where the energy storage apparatus according to the embodiment is disassembled.

First, a configuration of an energy storage apparatus 1 according to the present embodiment will be described. FIG. 1 is a perspective view illustrating an external appearance of the energy storage apparatus 1 according to the present embodiment. FIG. 2 is an exploded perspective view illustrating each constituent element in a case where the energy storage apparatus 1 according to the present embodiment is disassembled.

The energy storage apparatus 1 is an apparatus capable of being charged with electricity from the outside and discharging electricity to the outside, and has a substantially rectangular parallelepiped shape in the present embodiment. The energy storage apparatus 1 is a battery module (assembled battery) used for energy storage application, power supply application, or the like. Specifically, the energy storage apparatus 1 is used as a battery or the like for driving or starting an engine of a moving body such as an automobile, a motorcycle, a watercraft, a ship, a snowmobile, an agricultural machine, a construction machine, or a railway vehicle for electric railway. Examples of the automobile include an electric vehicle (EV), a hybrid electric vehicle (HEV), a plug-in hybrid electric vehicle (PHEV), and a gasoline vehicle. Examples of the railway vehicle for an electric railway include a train, a monorail, and a linear motor car. The energy storage apparatus 1 can also be used as a stationary battery or the like used for home use, a generator, or the like.

As illustrated in FIG. 1 and FIG. 2, the energy storage apparatus 1 includes an outer case 10 composed of a lid body 11 and an outer case main body 12, and a plurality of energy storage devices 20, a bus bar frame 30, a plurality of bus bars 40, a harness plate 50, a wiring 60, and the like are housed inward the outer case 10.

The outer case 10 is a case (module case) having a rectangular shape (box shape) which constitutes an outer case of the energy storage apparatus 1. That is, the outer case 10 is arranged outward the energy storage devices 20 and the like, fixes the energy storage device 20 and the like at a predetermined position, and protects the energy storage device 20 and the like from an impact or the like. The outer case 10 is formed of an insulating member such as polycarbonate (PC), polypropylene (PP), polyethylene (PE), polystyrene (PS), polyphenylene sulfide resin (PPS), polyphenylene ether (PPE (including modified PPE)), polyethylene terephthalate (PET), polybutylene terephthalate (PBT), polyether ether ketone (PEEK), tetrafluoroethylene-perfluoroalkyl vinyl ether (PFA), polytetrafluoroethylene (PTFE), polyether sulfone (PES), ABS resin, or a composite material of these, or insulation-coated metal. With such a configuration, the outer case 10 prevents the energy storage device 20 and the like from coming into contact with a metal member or the like.

The outer case 10 includes the lid body 11 having a flat rectangular shape which constitutes a lid body (outer lid) of the outer case 10, and the outer case main body 12 which constitutes a main body of the outer case 10. The outer case main body 12 is a bottomed rectangular cylindrical housing on which an opening is formed. That is, the lid body 11 is arranged so as to close the opening of the outer case main body 12. In other words, the lid body 11 is arranged above (the Z-axis direction plus side of) other members such as the outer case main body 12, a plurality of the energy storage devices 20, the bus bar frame 30, a plurality of the bus bars 40, the harness plate 50, and the wiring 60. The lid body 11 is an example of the third member arranged above the harness plate 50 (first member).

The lid body 11 and the outer case main body 12 may be formed of members of the same material, or may be formed of members of different materials. An opening portion 11a which is a rectangular through hole is formed in a center portion of the lid body 11, an opening portion 11b which is a rectangular notch is formed in a corner portion on the X-axis direction minus side and on both sides in the Y-axis direction of the lid body 11, and an opening portion 11c which is a rectangular notch is formed at the X-axis direction center and on the Y-axis direction minus side of the lid body 11.

The energy storage device 20 is a secondary battery (battery cell) capable of being charged with electricity and discharging electricity, and more specifically, is a nonaqueous electrolyte secondary battery such as a lithium ion secondary battery. The energy storage device 20 has a flat rectangular parallelepiped shape (prismatic shape), and in the present embodiment, eight of the energy storage devices 20 are arranged in the Y-axis direction (also referred to as an arrangement direction). The energy storage device 20 is not limited to a nonaqueous electrolyte secondary battery, and may be a secondary battery other than a nonaqueous electrolyte secondary battery, or may be a capacitor. The energy storage device 20 does not need to be a secondary battery and may be a primary battery that can use stored electricity without being charged by the user. The energy storage device 20 may be a battery using a solid electrolyte. The shape of the energy storage device 20 is not limited to the rectangular parallelepiped shape, may be a polygonal columnar shape other than a rectangular parallelepiped shape, a cylindrical shape, an elliptical columnar shape, or the like, or can be a pouch-type energy storage device. The number of the energy storage devices 20 being arranged is also not particularly limited.

To be more specific, the energy storage device 20 includes a case 21 made from metal, and a positive electrode terminal 22 and a negative electrode terminal 23 which are electrode terminals made from metal are formed on a lid portion of the case 21. The lid portion of the case 21 may be provided with an electrolyte solution filling unit for filling with an electrolyte solution, a gas release valve for releasing pressure by discharging a gas when the pressure in the case 21 rises, and the like. Inward the case 21, an electrode assembly (also referred to as an energy storage element or a power generating element), a current collector (a positive electrode current collector and a negative electrode current collector) and the like are arranged, and an electrolyte solution (non-aqueous electrolyte) and the like are sealed. However, detailed description of these is omitted.

The positive electrode terminal 22 and the negative electrode terminal 23 are arranged so as to project from the lid portion of the case 21 toward the lid body 11 (upward, that is, toward the Z-axis direction plus side). The outermost positive electrode terminal 22 and the outermost negative electrode terminal 23 of a plurality of the energy storage devices 20 are arranged so as to be exposed from the opening portion 11b of the lid body 11 described above and an opening portion 31 of the bus bar frame 30 described later. The outermost positive electrode terminal 22 and the outermost negative electrode terminal 23 are connected to an external terminal (not shown) or function as an external terminal, so that the energy storage apparatus 1 can be charged with electricity from the outside and discharge electricity to the outside.

The bus bar frame 30 is a flat rectangular member capable of electrically insulating the bus bar 40 from another member and regulating the position of the bus bar 40. The bus bar frame 30 is formed of an insulating material or the like similar to that of the outer case 10 described above. The bus bar frame 30 also has a function of reinforcing the outer case main body 12 as an inner lid of the outer case 10. The opening portion 31 which is a rectangular notch is formed in a corner portion on the X-axis direction minus side and both sides in the Y-axis direction of the bus bar frame 30.

To be more specific, the bus bar frame 30 positions the bus bars 40 with respect to a plurality of the energy storage devices 20. That is, the bus bar frame 30 is placed above (on the Z-axis direction plus side of) a plurality of the energy storage devices 20, and is positioned with respect to a plurality of the energy storage devices 20. The bus bar 40 is placed and positioned on the bus bar frame 30. With such a configuration, the bus bar 40 is positioned with respect to a plurality of the energy storage devices 20, and is joined to electrode terminals (the positive electrode terminal 22 and the negative electrode terminal 23) included in a plurality of the energy storage devices 20. As the bus bar frame 30, one that is arranged below the bus bar 40 on which the bus bar 40 is not directly placed (the bus bar 40 is not held) is included.

As described above, the bus bar frame 30 holds the energy storage device 20 from above, is arranged below the harness plate 50, and holds the harness plate 50 from below. The configuration in which the bus bar frame 30 holds the harness plate 50 will be described in detail later. The bus bar frame 30 is an example of the second member arranged below the harness plate 50 (first member).

The bus bar 40 is a rectangular plate-like member which is arranged on a plurality of the energy storage devices 20 (on the bus bar frame 30) and electrically connects electrode terminals of a plurality of the energy storage devices 20 to each other. The material of the bus bar 40 is not particularly limited, and the bus bar 40 is formed of metal such as aluminum, an aluminum alloy, copper, a copper alloy, stainless steel, or the like, or a combination of these, or a conductive member or the like other than metal. In the present embodiment, the bus bar 40 connects the positive electrode terminal 22 and the negative electrode terminal 23 of the energy storage devices 20 adjacent to each other to connect eight of the energy storage devices 20 in series. The mode of connection of the energy storage devices 20 is not limited to the above, and series connection and parallel connection may be combined in any way.

The harness plate 50 is a plate-like and rectangular member which holds the wiring 60, and is arranged above the energy storage device 20. Specifically, the harness plate 50 is arranged between the bus bar frame 30 and the lid body 11, is placed on the bus bar frame 30, and is held by the bus bar frame 30. The harness plate 50 holds electrical components such as the wiring 60 and connectors 61 and 62, and performs electrical insulation between the wiring 60 and the like and other members, position regulation of the wiring 60 and the like, and the like. The harness plate 50 is a thin resin member or the like formed of an insulating material or the like similar to that of the outer case 10 described above. The harness plate 50 is an example of the first member having a plate-like shape arranged above the energy storage device 20.

The wiring 60 is an internal harness or the like including a wiring for making various connections such as a wiring (specifically, a voltage detection line) connecting each electrode terminal of the energy storage device 20 and the connector 61 and a wiring (specifically, a temperature detection line) connecting a thermistor (not illustrated) and the connector 62, and is attached to the harness plate 50.

The connector 61 is a connector for high voltage connected to each electrode terminal of the energy storage device 20. The connector 61 is attached to the harness plate 50 and arranged so as to be exposed from the opening portion 11a formed in a center portion of the lid body 11. The connector 62 is, for example, a low-voltage connector connected to a thermistor (not illustrated). The connector 62 is attached to the harness plate 50 and arranged so as to be exposed from the opening portion 11c formed in an end portion of the lid body 11. The connectors 61 and 62 are arranged such that a connection port is opened outward, and an external wiring is connected to the connection port.

A detection terminal 41 is connected to a tip of the wiring 60, and the detection terminal 41 is connected to an electrode terminal of the energy storage device 20 or the bus bar 40.

[2 Description of Configuration of Bus Bar Frame 30 and Harness Plate 50]

Next, a configuration of the bus bar frame 30 and the harness plate 50, particularly, a configuration in which the bus bar frame 30 holds the harness plate 50 will be described in detail.

Figure 3:
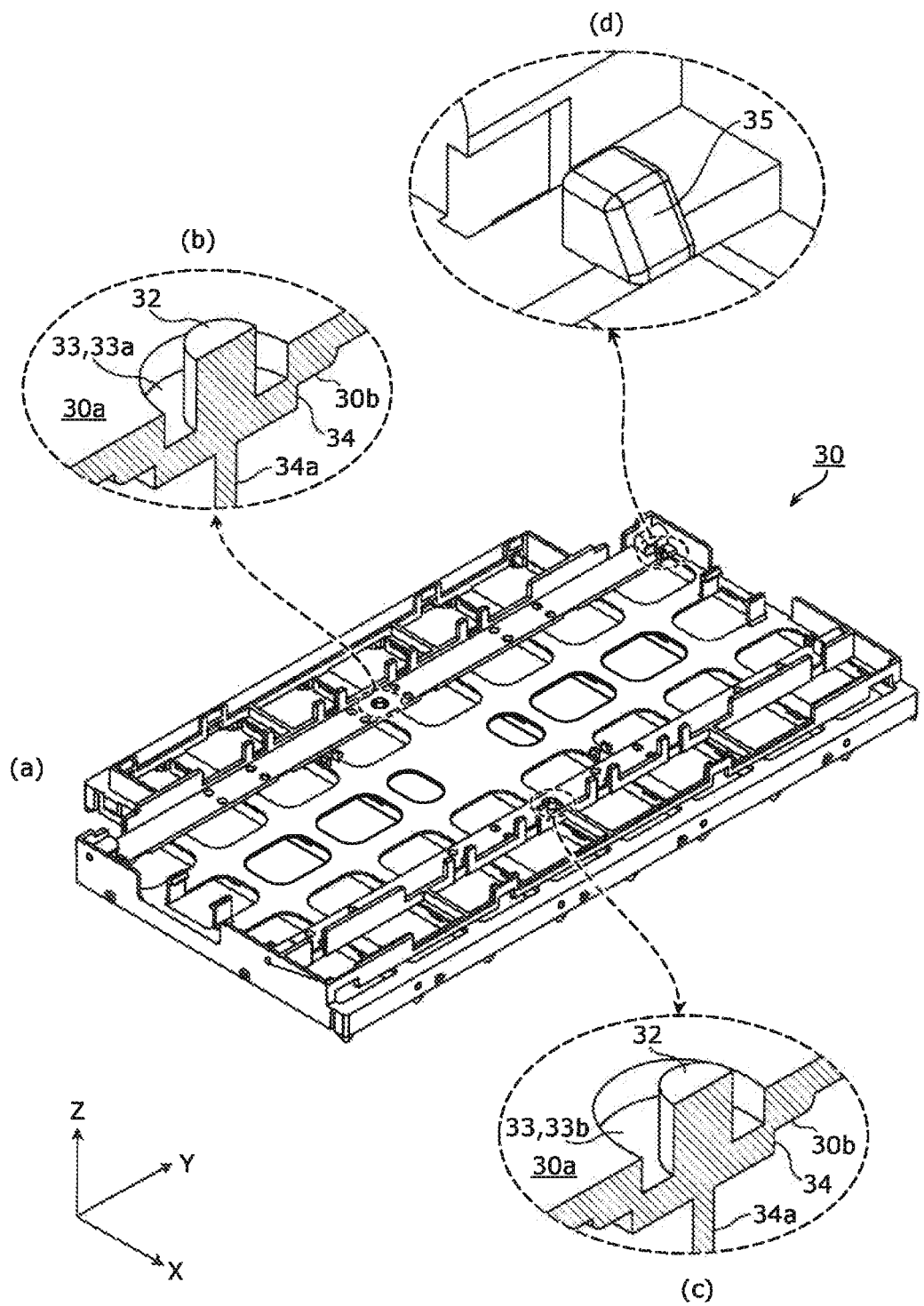
FIG. 3 is a perspective view and a cross-sectional view illustrating a configuration of a bus bar frame according to the embodiment.

FIG. 3 is a perspective view and a cross-sectional view illustrating a configuration of the bus bar frame 30 according to the present embodiment. Specifically, FIG. 3(a) is an enlarged perspective view illustrating the bus bar frame 30 illustrated in FIG. 2. FIGS. 3(b) and 3(c) are enlarged cross-sectional views illustrating a configuration in a case where a portion surrounded by a broken line in FIG. 3(a) is cut along a plane parallel to a YZ plane, and FIG. 3(d) is an enlarged perspective view illustrating a configuration of a portion surrounded by a broken line in FIG. 3(a).

Figure 4:
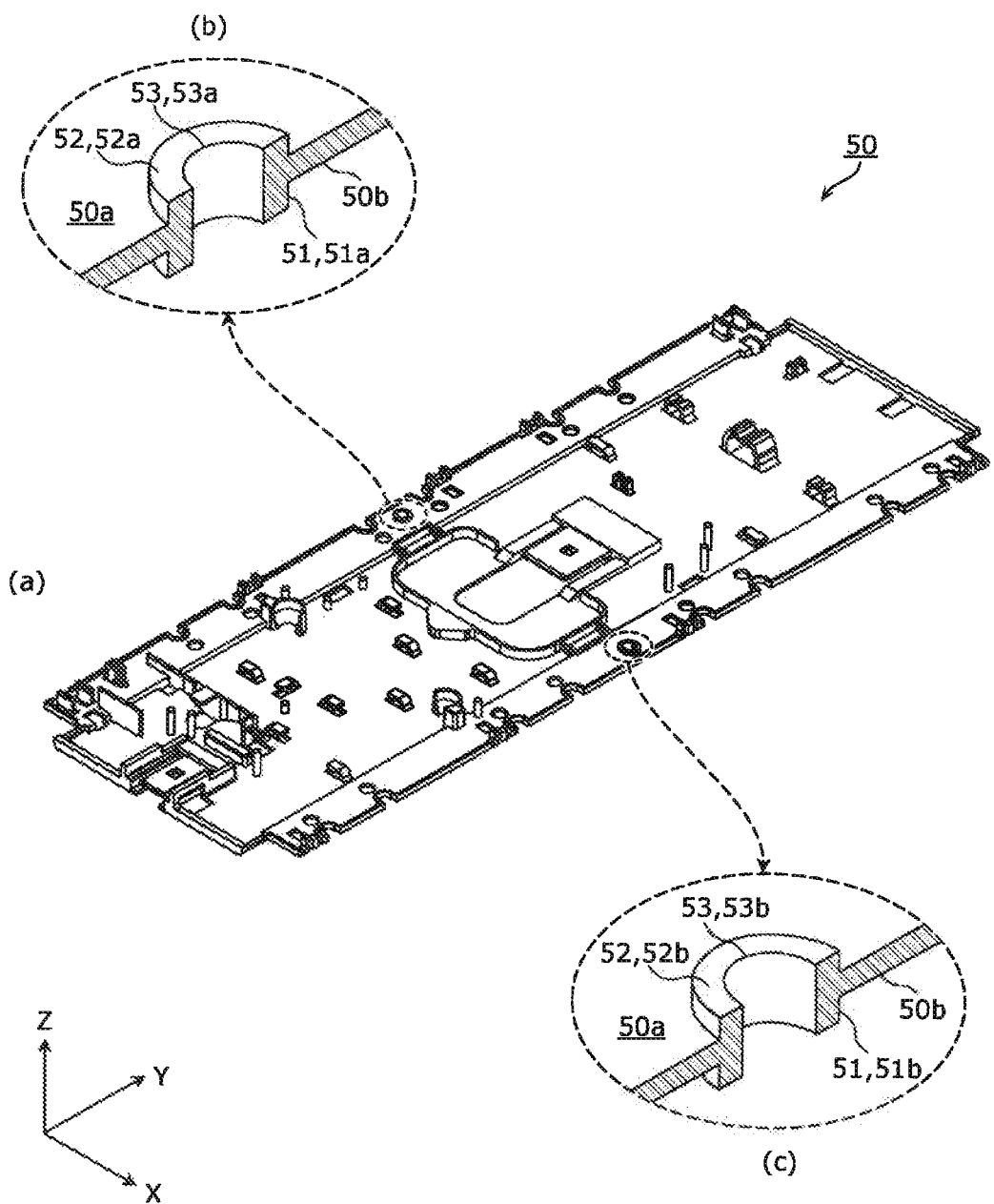
FIG. 4 is a perspective view and a cross-sectional view illustrating a configuration of a harness plate according to the embodiment.

FIG. 4 is a perspective view and a cross-sectional view illustrating a configuration of the harness plate 50 according to the present embodiment. Specifically, FIG. 4(a) is an enlarged perspective view illustrating the harness plate 50 illustrated in FIG. 2, and FIGS. 4(b) and 4(c) are enlarged cross-sectional views illustrating a configuration in a case where a portion surrounded by a broken line in FIG. 4(a) is cut along a plane parallel to the YZ plane.

Figure 5:
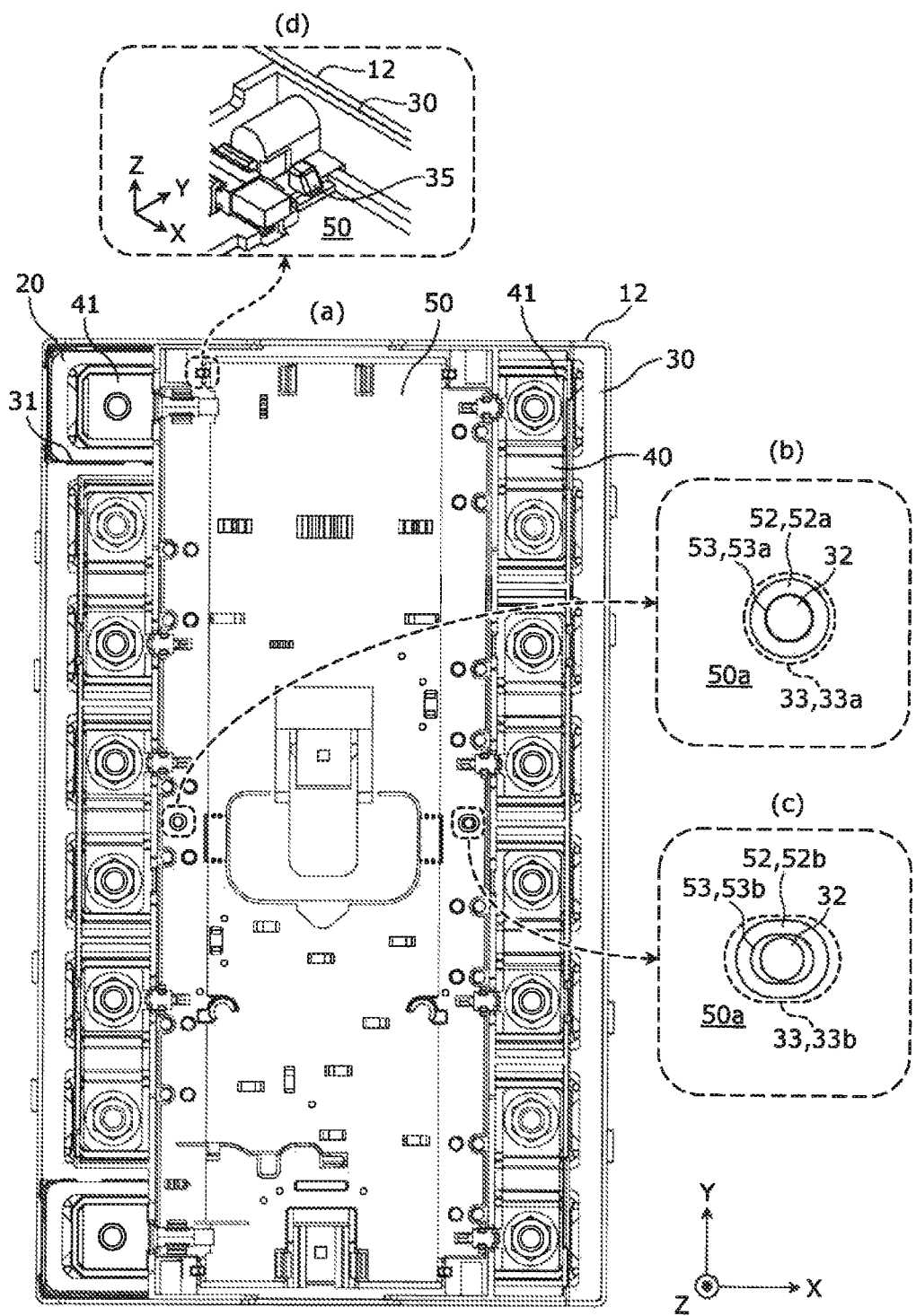
FIG. 5 is a plan view and a perspective view illustrating a configuration in a state where the bus bar frame and the harness plate according to the embodiment are assembled.

FIG. 5 is a plan view and a perspective view illustrating a configuration in a state where the bus bar frame 30 and the harness plate 50 according to the present embodiment are assembled. To be more specific, FIG. 5(a) is a plan view illustrating a configuration in a case where a state in which the lid body 11 and the wiring 60 are removed from the energy storage apparatus 1 is viewed from the Z-axis direction plus side. FIGS. 5(b) and 5(c) are enlarged plan views illustrating a configuration of a portion surrounded by a broken line in FIG. 5(a), and FIG. 5(d) is an enlarged perspective view illustrating a configuration of a portion surrounded by a broken line in FIG. 5(a).

Figure 6:
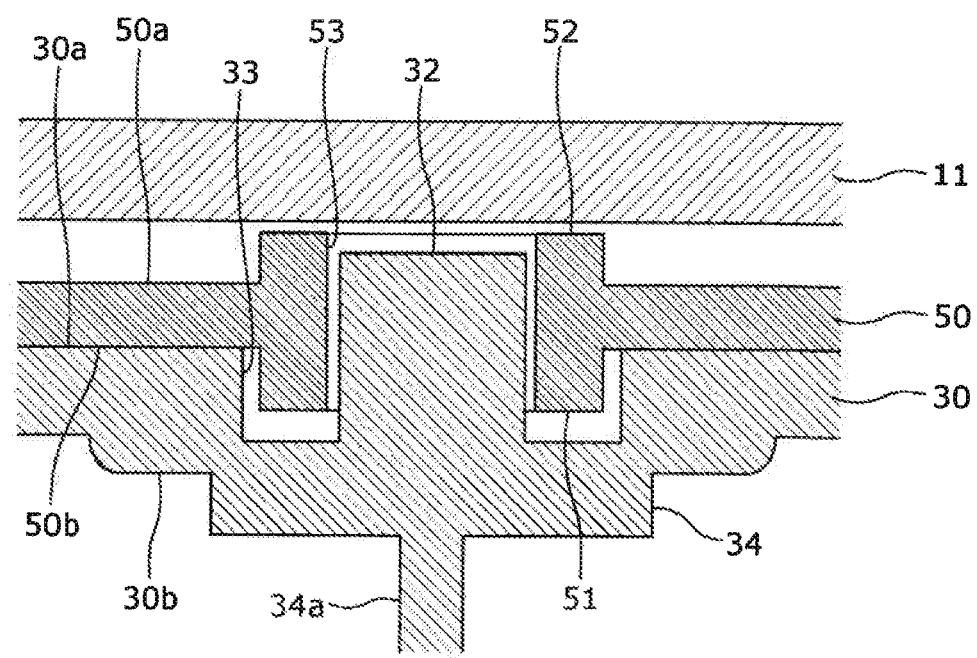
FIG. 6 is a cross-sectional view illustrating a configuration in which the bus bar frame according to the embodiment holds the harness plate.

FIG. 6 is a cross-sectional view illustrating a configuration in which the bus bar frame 30 according to the present embodiment holds the harness plate 50. Specifically, FIG. 6 is a cross-sectional view illustrating a configuration in a case where the configuration of FIG. 3(b) and the configuration of FIG. 4(b) are assembled, that is, a configuration in a case where FIG. 5(b) is cut along a plane parallel to the YZ plane. In FIG. 6, the lid body 11 arranged above the harness plate 50 is also illustrated.

As described above, the bus bar frame 30 is arranged below the harness plate 50 and holds the harness plate 50 from below. That is, the harness plate 50 is placed on the bus bar frame 30 in a state where a main surface 50b abuts on (or approaches) a main surface 30a of the bus bar frame 30, and is held by the bus bar frame 30. As illustrated in FIGS. 3, 5, and 6, the bus bar frame 30 has a first convex part 32, a second concave part 33, and a fourth convex part 34 on both sides in the X-axis direction of a center portion in the Y-axis direction, and has protrusions 35 at four corners on both sides in the Y-axis direction and on both sides in the X-axis direction. As illustrated in FIGS. 4, 5, and 6, the harness plate 50 has a second convex part 51, a third convex part 52, and a through hole 53 on both sides in the X-axis direction of a center portion in the Y-axis direction. The first convex part 32 of the bus bar frame 30 is inserted into the through hole 53 of the harness plate 50. The second convex part 51 of the harness plate 50 is inserted into the second concave part 33 of the bus bar frame 30. First, each part of the bus bar frame 30 will be described in detail.

The first convex part 32 is a columnar convex part (protrusion) which is formed on the bus bar frame 30 and projects toward the Z-axis direction plus side. That is, the first convex part 32 projects toward the harness plate 50. Specifically, the first convex part 32 is arranged so as to project more than main surfaces 50a and 50b of the harness plate 50. In other words, the first convex part 32 is arranged so as to project such that an end portion (tip) on the Z-axis direction plus side is located further on the Z-axis direction plus side than the main surfaces 50a and 50b. The first convex part 32 only needs to be arranged so as to project from at least one of the main surfaces 50a and 50b. That is, as long as the first convex part 32 is arranged to project further than the main surface 50b, the first convex part 32 does not need to project further than the main surface 50a.

The main surface refers to a flat surface having a relatively large range of a member surface, and refers to a surface different from a surface of a concave part or a convex part. That is, the main surface 50a is a flat surface different from a surface on the Z-axis direction plus side of the third convex part 52 of a surface on the Z-axis direction plus side of the harness plate 50. The main surface 50b is a flat surface different from a surface on the Z-axis direction minus side of the second convex part 51 of a surface on the Z-axis direction minus side of the harness plate 50. The same applies to the main surfaces 30a and 30b of the bus bar frame 30 described later.

The second concave part 33 is a concave part recessed from the main surface 30a on the Z-axis direction plus side of the bus bar frame 30 toward the Z-axis direction minus side. The second concave part 33 is arranged so as to surround the periphery of the first convex part 32. That is, the second concave part 33 is a concave part formed as the periphery of the first convex part 32 is recessed. It can also be said that the first convex part 32 projects toward the Z-axis direction plus side from a bottom surface of the second concave part 33. In the present embodiment, the second concave part 33 is an annular concave part arranged so as to surround the entire circumference of the first convex part 32 as the entire circumference of the first convex part 32 is recessed.

The fourth convex part 34 is a projecting part which projects toward the Z-axis direction minus side from the main surface 30b on the Z-axis direction minus side of the bus bar frame 30, and is arranged to extend in the X-axis direction. That is, the fourth convex part 34 is arranged on the opposite side of the first convex part 32 and projects toward the energy storage device 20. The fourth convex part 34 has a spacer 34a which projects toward the Z-axis direction minus side and is arranged between two of the energy storage devices 20. The spacer 34a is a plate-like and rectangular portion extending in the X-axis direction, and is arranged on the Z-axis direction plus side between two of the energy storage devices 20. In the present embodiment, the fourth convex parts 34 on both sides in the X-axis direction of the bus bar frame 30 are connected to form one convex part, and the spacers 34a on both sides in the X-axis direction are also connected to form one spacer.

The protrusion 35 is a protrusion that projects in the X-axis direction and is arranged on the Z-axis direction plus side of the harness plate 50. That is, the protrusions 35 are arranged on the Z-axis direction plus side of the harness plate 50 at four corners on both sides in the Y-axis direction and both sides in the X-axis direction of the harness plate 50, and restrict the four corners of the harness plate 50 from moving to the Z-axis direction plus side.

Next, each part of the harness plate 50 will be described in detail. The second convex part 51 is an annular (tubular) convex part projecting from the main surface 50b on the Z-axis direction minus side of the harness plate 50 to the Z-axis direction minus side. That is, the second convex part 51 projects toward the bus bar frame 30. Specifically, the second convex part 51 projects along the periphery of the first convex part 32 so as to surround the periphery of the first convex part 32 of the bus bar frame 30. In the present embodiment, the second convex part 51 projects along the entire circumference of the first convex part 32 so as to surround the entire circumference of the first convex part 32. That is, the second convex part 51 has a shape into which the first convex part 32 is inserted.

The second convex part 51 is inserted into the second concave part 33. That is, the second convex part 51 is arranged so as to project further than the main surface 30a on the Z-axis direction plus side of the bus bar frame 30. In other words, the second convex part 51 is arranged so as to project such that an end portion (tip) on the Z-axis direction minus side is located further on the Z-axis direction minus side than the main surface 30a. When the depth of the second concave part 33 is large, the second convex part 51 may be arranged so as to project further than the main surface 30b on the Z-axis direction minus side of the bus bar frame 30.

The third convex part 52 is an annular (tubular) convex part projecting from the main surface 50a on the Z-axis direction plus side of the harness plate 50 to the Z-axis direction plus side. That is, the third convex part 52 projects toward the lid body 11 (third member). In the present embodiment, the third convex part 52 is arranged along the periphery of the first convex part 32 so as to surround the periphery of the first convex part 32 of the bus bar frame 30. That is, the third convex part 52 is arranged along the entire circumference of the first convex part 32 so as to surround the entire circumference of the first convex part 32. As described above, the third convex part 52 has a shape into which the first convex part 32 is inserted.

As described above, the first convex part 32 is inserted into the second convex part 51 and the third convex part 52. Specifically, the through hole 53 is formed in the second convex part 51 and the third convex part 52, and the first convex part 32 of the bus bar frame 30 is inserted into the through hole 53. The through hole 53 is a through hole penetrating the harness plate 50 in the Z-axis direction.

The through hole 53 is arranged in a center portion of the harness plate 50 in the arrangement direction (Y-axis direction) of the energy storage devices 20. The shape (size) of the through hole 53 is different on both sides in the X-axis direction of the harness plate 50. Specifically, as illustrated in FIGS. 4(b) and 5(b), a through hole 53a on the X-axis direction minus side of the harness plate 50 is a through hole having a circular shape in a top view. In contrast, as illustrated in FIGS. 4(c) and 5(c), the through hole 53b on the X-axis direction plus side of the harness plate 50 is a through hole having an elliptical shape (an elliptical shape longer than the length in the X-axis direction of the first convex part 32) elongated in the X-axis direction in top view. That is, the through hole 53b has a long hole shape in top view, and the first convex part 32 has a size by which the first convex part 32 is movable in the through hole 53b. A plurality of the through holes 53 are arranged in a direction (X-axis direction) intersecting the arrangement direction (Y-axis direction) of the energy storage devices 20, and at least one (through hole 53b) of a plurality of the through holes 53 has a long hole shape extending in the intersecting direction (X-axis direction) in top view.

With such a configuration, when two of the first convex parts 32 of the bus bar frame 30 are inserted into the through holes 53a and 53b, a variation in a length dimension between the two first convex parts 32 can be absorbed. The positions and shapes of the through hole 53a and the first convex part 32 are formed with high accuracy such that an inner diameter of the through hole 53a is slightly larger than an outer diameter of the first convex part 32 and play (clearance) is little, and the through hole 53a and the first convex part 32 serve as a reference for positioning.

The second convex part 51 of the harness plate 50 is inserted into the second concave part 33. The second concave part 33 has a different shape (size) on both sides in the X-axis direction of the bus bar frame 30. To be more specific, as illustrated in FIG. 3(b) and FIG. 5(b), a second concave part 33a on the X-axis direction minus side of the bus bar frame 30 is a concave part having an annular shape which has a circular outer shape in top view (the same applies hereinafter when viewed from the Z-axis direction plus side). In contrast, as illustrated in FIGS. 3(c) and 5(c), a second concave part 33b on the X-axis direction plus side of the bus bar frame 30 is a convex part having an elliptical annular shape (an elliptical shape longer than the length in the X-axis direction of a second convex part 51b) elongated in the X-axis direction in top view. With such a configuration, when the second convex parts 51a and 51b of the harness plate 50 are inserted into the second concave parts 33a and 33b, a variation in a length dimension between the second convex parts 51a and 51b can be absorbed. An inner diameter of the second concave part 33a is larger than an outer diameter of the second convex part 51a, and play (clearance) is larger than the play (clearance) of the through hole 53a and the first convex part 32. In this manner, as described above, the through hole 53a and the first convex part 32 serve as a reference for positioning.

In a manner corresponding to the shape of the through hole 53, the shapes (sizes) of the second convex part 51 and the third convex part 52 are also different on both sides in the X-axis direction of the harness plate 50. Specifically, as illustrated in FIG. 4(b), the second convex part 51a and the third convex part 52a on the X-axis direction minus side of the harness plate 50 are convex parts having an annular shape (cylindrical shape) in top view. In contrast, as illustrated in FIG. 4(c), the second convex part 51b and a third convex part 52b on the X-axis direction plus side of the harness plate 50 are convex parts having an elongated annular shape (elliptical cylindrical shape) elongated in the X-axis direction in top view.

In the present embodiment, the first convex part 32 is inserted into the through hole 53 without being fitted into the through hole 53, but may be fitted into the through hole 53. Similarly, the second convex part 51 is inserted into the second concave part 33 without being fitted into the second concave part 33, but may be fitted into the second concave part 33.

Two sets of the first convex part 32, the second concave part 33, the fourth convex part 34, the second convex part 51, the third convex part 52, and the through hole 53 are formed in a center portion in the Y-axis direction and in both end portions in the X-axis direction of the bus bar frame 30 and the harness plate 50. However, the arrangement positions and the number of sets of these are not particularly limited. Four sets of these may be formed at four corners of both end portions in the X-axis direction and both end portions in the Y-axis direction of the bus bar frame 30 and the harness plate 50, or only one set may be formed in a center portion in the X-axis direction and a center portion in the Y-axis direction. However, in a case where the harness plate 50 is warped, it is considered that the center portion in the Y-axis direction is most lifted, and thus the set is preferably arranged in the center portion in the Y-axis direction of the harness plate 50. As the above set is set in the center portion in the Y-axis direction of the harness plate 50, it is possible to suppress variations in dimensions of the bus bar frame 30 and the harness plate 50 to be small.

[3 Description of Effect]

As described above, according to the energy storage apparatus 1 according to the embodiment of the present invention, the bus bar frame 30 (second member) has the first convex part 32, and the harness plate 50 (first member) has the through hole 53 into which the first convex part 32 is inserted and the second convex part 51 which projects so as to surround the periphery of the first convex part 32. In this manner, as the second convex part 51 which projects so as to surround the periphery of the first convex part 32 of the bus bar frame 30 is formed on the harness plate 50, the first convex part 32 is arranged along the second convex part 51 and hence, it is possible to prevent the first convex part 32 from being detached from the through hole 53. In this manner, it is possible to prevent the harness plate 50 from being detached from the bus bar frame 30, and thus, it is possible to suppress displacement of the harness plate 50.

The bus bar frame 30 is arranged so as to surround the periphery of the first convex part 32, and has the second concave part 33 into which the second convex part 51 of the harness plate 50 is inserted. As described above, by forming the second concave part 33 into which the second convex part 51 of the harness plate 50 is inserted around the first convex part 32 of the bus bar frame 30, the harness plate 50 and the bus bar frame 30 can be arranged close to each other. In this manner, even if the second convex part 51 is formed on the harness plate 50, it is possible to suppress generation of a wasteful space, so that space saving can be achieved.

The first convex part 32 of the bus bar frame 30 is arranged to project further than the main surfaces 50a and 50b of the harness plate 50. As described above, by arranging the first convex part 32 of the bus bar frame 30 in a manner projecting further than the main surfaces 50a and 50b of the harness plate 50, it is possible to suppress the first convex part 32 from being detached from the harness plate 50. In this manner, it is possible to prevent the harness plate 50 from being detached from the bus bar frame 30, and thus, it is possible to suppress displacement of the harness plate 50.

Since the through hole 53 is formed in a long hole shape as viewed in top view, when the first convex part 32 is inserted into the through hole 53, a clearance in which the first convex part 32 can move in the through hole 53 is obtained. In this manner, assembling work of the harness plate 50 and the bus bar frame 30 can be easily performed.

At least one (through hole 53b) of a plurality of the through holes 53 arranged in a direction (X-axis direction) intersecting the arrangement direction of the energy storage device 20 is formed in a long hole shape extending in the intersecting direction in top view. In this manner, when a plurality of the first convex parts 32 are inserted into a plurality of the through holes 53, variations in positions and dimensions in the intersecting direction of a plurality of the through holes 53 can be absorbed.

As the through hole 53 is arranged in a center portion in the Y-axis direction of the harness plate 50, variations in dimensions between the harness plate 50 and the bus bar frame 30 can be suppressed to be small.

Since the lid body 11 (third member) is arranged above the harness plate 50, the lid body 11 can prevent the harness plate 50 from being warped or can regulate the upward movement of the harness plate 50. In this manner, it is possible to prevent the harness plate 50 from being detached from the bus bar frame 30, and thus, it is possible to suppress displacement of the harness plate 50.

Since the harness plate 50 has the third convex part 52 projecting toward the lid body 11, the movement of the harness plate 50 toward the Z-axis direction plus side is restricted by the third convex part 52 abutting on the lid body 11. In this manner, it is possible to prevent the harness plate 50 from being detached from the bus bar frame 30, and thus, it is possible to suppress displacement of the harness plate 50.

By forming the first convex part 32 on the lower bus bar frame 30 and forming the through hole 53 on the upper harness plate 50, it is possible to confirm a state where the first convex part 32 of the bus bar frame 30 is inserted into the through hole 53 of the harness plate 50 from above. In this manner, it is possible to reduce mistakes in inserting the first convex part 32 into the through hole 53, and thus, it is possible to more reliably suppress displacement of the position of the harness plate 50.

The harness plate may be formed of a thin resin member which is easily warped. However, even in this case, it is possible to prevent the harness plate from being warped and detached from the bus bar frame 30. In this manner, it is possible to suppress displacement of the position of the harness plate 50.

[4 Description of Variation]
(First Variation)

Figure 7:
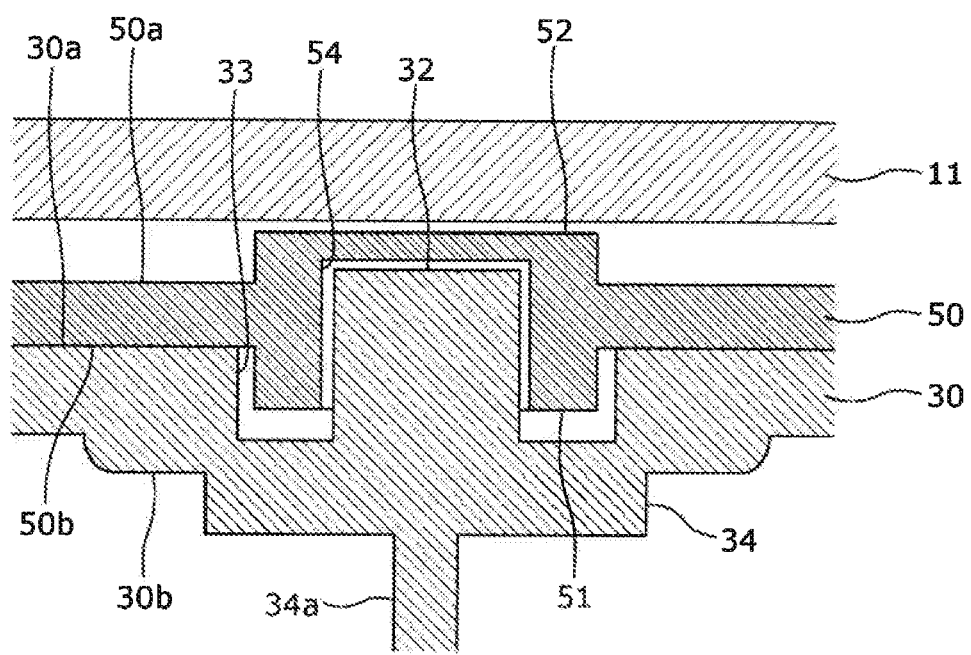
FIG. 7 is a cross-sectional view illustrating a configuration in which the bus bar frame according to a first variation of the embodiment holds the harness plate.

Next, a first variation of the above embodiment will be described. FIG. 7 is a cross-sectional view illustrating a configuration in which the bus bar frame 30 according to the first variation of the present embodiment holds the harness plate 50. Specifically, FIG. 7 is a diagram corresponding to FIG. 6.

As illustrated in FIG. 7, the harness plate 50 in the present variation includes a first concave part 54 instead of the through hole 53 of the harness plate 50 in the above embodiment. Other configurations of the present variation are similar to those of the above embodiment, and thus detailed description will be omitted.

The first concave part 54 is a concave part formed in the second convex part 51 and the third convex part 52 of the harness plate 50. That is, the first concave part 54 is formed as a surface on the Z-axis direction minus side of the second convex part 51 is recessed on the Z-axis direction plus side to the position of the third convex part 52. In other words, the first concave part 54 is formed as the third convex part 52 is formed into a bottomed cylindrical portion having a bottom surface on the Z-axis direction plus side. The first convex part 32 of the bus bar frame 30 is inserted into the first concave part 54. The shape as viewed in top view of the first concave part 54 has the same shape (circular shape or elliptical shape) as the through hole 53 in the above embodiment.

That is, the first concave part 54 corresponding to the through hole 53b in the above embodiment has a long groove shape in top view, and the first convex part 32 has a size so as to be movable in the first concave part 54. A plurality of the first concave parts 54 are arranged in a direction (X-axis direction) intersecting the arrangement direction (Y-axis direction) of the energy storage devices 20, and at least one of a plurality of the first concave parts 54 has a long hole shape extending in the intersecting direction (X-axis direction) in top view. The first concave part 54 is arranged in a center portion of the harness plate 50 in the arrangement direction (Y-axis direction) of the energy storage devices 20.

As described above, according to the energy storage device according to the present variation, substantially the same advantageous effect as that of the above embodiment can be obtained. In particular, in the present variation, since a portion of the harness plate 50 into which the first convex part 32 of the bus bar frame 30 is inserted can be used as the concave part (first concave part 54) instead of a through hole, the degree of freedom in designing the structure in which the bus bar frame 30 holds the harness plate 50 can be improved.

(Second Variation)

Figure 8:
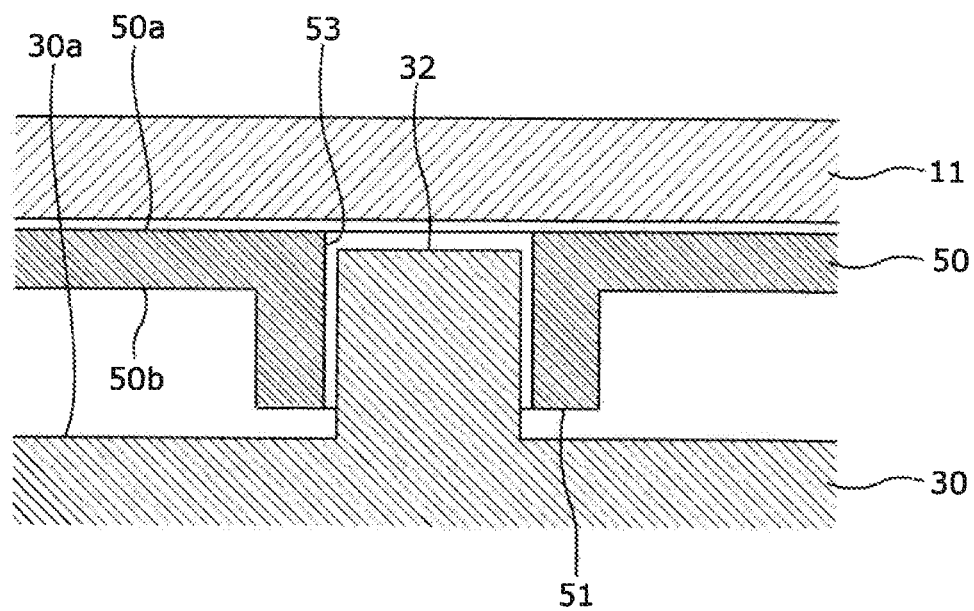
FIG. 8 is a cross-sectional view illustrating a configuration in which the bus bar frame according to a second variation of the embodiment holds the harness plate.
Figure 8:
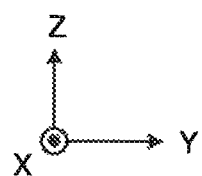

Next, a second variation of the above embodiment will be described. FIG. 8 is a cross-sectional view illustrating a configuration in which the bus bar frame 30 according to the second variation of the present embodiment holds the harness plate 50. Specifically, FIG. 8 is a diagram corresponding to FIG. 6.

As illustrated in FIG. 8, the bus bar frame 30 according to the present variation does not include the second concave part 33 and the fourth convex part 34 included in the bus bar frame 30 according to the above embodiment. The harness plate 50 in the present variation does not have the third convex part 52 of the harness plate 50 in the above embodiment. That is, the first convex part 32 is not arranged to project further than the main surface 50a of the harness plate 50. Other configurations of the present variation are similar to those of the above embodiment, and thus detailed description will be omitted.

As described above, according to the energy storage device according to the present variation, substantially the same advantageous effect as that of the above embodiment can be obtained. In particular, in the present variation, since the bus bar frame 30 does not have the second concave part 33 and the fourth convex part 34, the structure of the bus bar frame 30 can be simplified. Since the harness plate 50 does not have the third convex part 52, a gap between the harness plate 50 and the lid body 11 can be reduced to achieve space saving.

In the present variation, not all the parts of the second concave part 33 and the fourth convex part 34 of the bus bar frame 30 and the third convex part 52 of the harness plate 50 are provided, but any part of the second concave part 33, the fourth convex part 34, and the third convex part 52 may be provided. The first convex part 32 may be arranged so as to project further than the main surface 50a of the harness plate 50.

(Other Variations)

Although the energy storage apparatus according to the present embodiment and the variations of the embodiment are described above, the present invention is not limited to the above embodiment and the variations of the embodiment. That is, the embodiment and the variation of the embodiment disclosed herein are illustrative in all respects and are not restrictive, and the scope of the present invention includes all changes within the meaning and scope equivalent to the claims.

In the above embodiment and the variation of the embodiment, the harness plate 50 is exemplified as an example of the first member. However, the first member is not limited to the harness plate as long as the first member is a plate-like member arranged above the energy storage device 20. Examples of the first member include an inner lid of an outer case on which no wiring is arranged, a circuit board, other plate-like members, or the like.

In the above embodiment and the variation of the embodiment, the bus bar frame 30 is exemplified as an example of the second member. However, the second member may be any member arranged below the harness plate 50, and is not limited to a bus bar frame. Examples of the second member include an intermediate spacer arranged between two of the energy storage devices 20 or an end spacer arranged in an end portion of a plurality of the energy storage devices 20, and the like.

In the above embodiment and the variation of the embodiment, the configurations of the bus bar frame 30 and the harness plate 50 may be the opposite way around. The harness plate 50 may have the first convex part 32 of the bus bar frame 30, and the bus bar frame 30 may have the second convex part 51 and the through hole 53 (or the first concave part 54) of the harness plate 50. The configuration may be such that the harness plate 50 has the second concave part 33 of the bus bar frame 30. That is, the configuration only needs to be such that a first one of the harness plate 50 and the bus bar frame 30 has the first convex part projecting toward a second one, and the second one has the first concave part or the through hole into which the first convex part of the first one is inserted, and the second convex part projecting along the periphery of the first convex part so as to surround the periphery of the first convex part. One of the harness plate 50 and the bus bar frame 30 only needs to be arranged so as to surround the periphery of the first convex part, and have the second concave part into which the second convex part of the second one is inserted. The same applies to other parts. This also makes it possible to achieve the same effect as that of the above embodiment and the variation of the embodiment.

In the above embodiment and the variation of the embodiment, the second convex part 51 of the harness plate 50 projects along the entire circumference of the first convex part 32 so as to surround the entire circumference of the first convex part 32. However, the second convex part 51 may project along a part of the periphery of the first convex part 32 so as to surround a part of the periphery of the first convex part 32 instead of the entire circumference of the first convex part 32. The second convex part 51 may be a plurality of convex parts intermittently arranged around the first convex part 32, or may be a convex part arranged so as to surround ¾, ⅔, ½, or the like of the entire circumference of the first convex part 32.

In the above embodiment and the first variation, the second concave part 33 of the bus bar frame 30 is arranged so as to surround the entire circumference of the first convex part 32, and the second convex part 51 of the harness plate 50 is inserted into the second concave part 33. However, the second concave part 33 may be arranged not on the entire circumference of the first convex part 32 but only on a part of the periphery of the first convex part 32. The second concave part 33 may be a plurality of concave parts intermittently arranged around the first convex part 32, or may be a concave part arranged so as to surround ¾, ⅔, ½, or the like of the entire circumference of the first convex part 32. In this case, the shape of the second convex part 51 is also appropriately determined according to the shape of the second concave part 33. The second convex part 51 does not need to be inserted into the second concave part 33.

In the above embodiment and the variation of the embodiment, the first convex part 32 of the bus bar frame 30 is arranged so as to project further than at least one of the main surfaces 50a and 50b of the harness plate 50. However, the first convex part 32 does not need to project from both the main surfaces 50a and 50b.

A mode constructed by optionally combining the constituent elements included in the above embodiment and the variation of the embodiment is also included in the scope of the present invention.

The present invention can be realized not only as an energy storage apparatus but also as the first member (harness plate 50 and the like) and the second member (bus bar frame 30 and the like).

INDUSTRIAL APPLICABILITY

The present invention can be applied to an energy storage apparatus or the like including an energy storage device such as a lithium ion secondary battery.

DESCRIPTION OF REFERENCE SIGNS

1: energy storage apparatus
10: outer case
11: lid body
11a, 11b, 11c, 31: opening portion
12: outer case main body
20: energy storage device
21: case
22: positive electrode terminal
23: negative electrode terminal
30: bus bar frame
30a, 30b, 50a, 50b: main surface
32: first convex part
33, 33a, 33b: second concave part
34: fourth convex part
34a: spacer
35: protrusion
40: bus bar
41: detection terminal
50: harness plate
51, 51a, 51b: second convex part
52, 52a, 52b: third convex part
53, 53a, 53b: through hole
54: first concave part
60: wiring
61, 62: connector

The invention claimed is:

1. An energy storage apparatus, comprising:
an energy storage device;
a plate-shaped first member arranged above the energy storage device; and
a second member arranged below the first member,
wherein a first one of the first member and the second member has a first convex part projecting toward a second one of the first member and the second member, and
the second one includes a first concave part or a through hole into which the first convex part is inserted, and a second convex part projecting along periphery of the first convex part so as to surround the periphery of the first convex part.

2. The energy storage apparatus according to claim 1, wherein the first one includes a second concave part into which the second convex part is inserted, the second concave part being arranged so as to surround the periphery of the first convex part.

3. The energy storage apparatus according to claim 1, wherein the first convex part is arranged so as to project further than a main surface of the second one.

4. The energy storage apparatus according to claim 1, wherein the first concave part or the through hole has a long groove shape or a long hole shape in top view.

5. The energy storage apparatus according to claim 1, wherein
a plurality of the energy storage devices are arranged in an arrangement direction, and a plurality of the first concave parts or the through holes are arranged in a direction intersecting the arrangement direction, and
at least one of a plurality of the first concave parts or the through holes has a long groove shape or a long hole shape extending in the intersecting direction in top view.

6. The energy storage apparatus according to claim 1, wherein
a plurality of the energy storage devices are arranged in an arrangement direction, and
the first concave part or the through hole is arranged in a center portion of the second one in the arrangement direction.

7. The energy storage apparatus according to claim 1, further comprising a third member arranged above the first member.

8. The energy storage apparatus according to claim 7, wherein the first member has a third convex part which projects toward the third member.

9. The energy storage apparatus according to claim 1, wherein
the second member has the first convex part, and
the first member has the through hole.

10. The energy storage apparatus according to claim 1, wherein the first member comprises a harness plate which holds a wiring.

* * * * *